No. 733,340. PATENTED JULY 7, 1903.
F. STAHL.
TOOL FOR BORING HOLES FOR SCREW PINS OR DOWELS IN WOODEN
RAILWAY SLEEPERS, &c.
APPLICATION FILED OCT. 30, 1901.
NO MODEL.
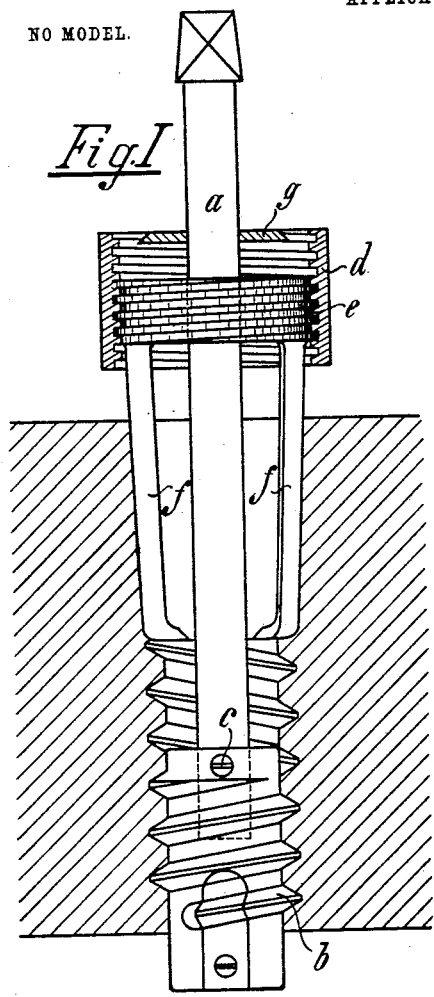
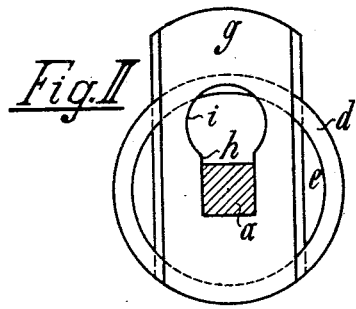
WITNESSES:
Isabella Waldron
Adelaide Claire Gleason
INVENTOR.
Felix Stahl
BY Richards & Co
ATTORNEYS
THE NORRIS PETERS CO., PHOTO-LITHO., WASHINGTON, D. C.

No. 733,340. Patented July 7, 1903.

UNITED STATES PATENT OFFICE.

FELIX STAHL, OF MUNICH, GERMANY, ASSIGNOR TO TRENAIL SOCIÉTÉ ANONYME POUR L'EXPLOITATION DU TRENAIL ET SES APPLICATIONS, OF PARIS, FRANCE, A FIRM.

TOOL FOR BORING HOLES FOR SCREW-PINS OR DOWELS IN WOODEN RAILWAY-SLEEPERS, &c.

SPECIFICATION forming part of Letters Patent No. 733,340, dated July 7, 1903.

Application filed October 30, 1901. Serial No. 80,538. (No model.)

*To all whom it may concern:*

Be it known that I, FELIX STAHL, a subject of the Emperor of Germany, and a resident of Munich, Bavaria, Germany, have invented certain new and useful Improvements in Countersink Attachments for Boring-Tools, of which the following is a specification.

This invention has for its object a tool or appliance by means of which holes to be formed in railway-sleepers or the like for receiving screw-pins or dowels, which holes are threaded in their lower part and end above in a conical or tapering opening, may always be bored in a single operation. For this object a spindle adapted to be rotated by a key or handle fitted thereon is connected, on the one hand, at the lower end with a threaded borer and, on the other hand, above the latter with a conical rasp which is adjustable in length and is mounted in such a way as to be axially rotatable, so that when the appliance or tool is used the thread-borer first cuts the necessary thread in the hole in the sleeper or the like, and then the countersink-cutter downwardly descending onto the threaded borer by its own weight conically enlarges the upper end of the threaded hole. This improved tool is shown in the accompanying drawings, in which—

Figures 1 and 2 are respectively a side elevation, partly in section, and a plan view with the shank in section.

The upper end of the rectangular spindle $a$ is adapted to receive a means for turning it, (a key, handle, or the like,) and upon the lower end of the spindle a threaded borer $b$ is so mounted and fixed by means of a set-screw $c$ that when the spindle is rotated the borer is carried along therewith. Above the threaded borer a countersink device is mounted on the spindle in such a way as to be axially movable or adjustable. This countersink device consists of a nut $d$ and a disk $e$, adapted to be screwed into the nut $d$, on the lower end of which disk a countersink-knife $f$ is fixed. According as the disk in the nut is screwed up or down the countersink-knives project more or less to the outside from the lower end of the nut, so that in this manner the length of the work of the cutter may be altered. The actual position of the cutter-disk in the nut may be fixed by a plate $g$, which is adjustably mounted on the upper end of the nut and engages with a slot $h$ exactly over the rectangular spindle. The said slot $h$ has at one end an enlargement $i$, which on a suitable adjustment of the disk $e$ allows the spindle to rotate relatively to the nut, and thereby allows of a correct adjustment of the cutter.

When the tool hereinbefore mentioned is introduced into the hole in the sleeper or the like which is to be bored out and is then revolved, the threaded borer first cuts the necessary thread in the hole and then the countersink device, which by its own weight descends until it rests on the threaded borer, conically enlarges the upper end of the hole.

Having thus described my invention, what I claim is—

The combination with a thread-cutting tool, of a countersink device mounted to slide freely on the shank of said thread-cutting tool by its own weight, and rotatable thereby, said countersink comprising a cutting portion and a relatively adjustable limiting-gage, substantially as described.

In witness whereof I have hereunto set my hand in presence of two witnesses.

FELIX STAHL.

Witnesses:
 THEKLA NENNER,
 ELLWOOD WILSON.